(12) United States Patent
Tobias et al.

(10) Patent No.: US 12,169,638 B2
(45) Date of Patent: *Dec. 17, 2024

(54) MODIFIED REPRESENTATION OF BACKUP COPY ON RESTORE

(71) Applicant: OWNBACKUP LTD., Tel Aviv (IL)

(72) Inventors: Yuval Tobias, Tel Aviv (IL); Ariel Berkman, Herzliya (IL)

(73) Assignee: OWN DATA COMPANY LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,634

(22) Filed: May 24, 2023

(65) Prior Publication Data

US 2023/0297266 A1    Sep. 21, 2023

Related U.S. Application Data

(63) Continuation of application No. 17/353,849, filed on Jun. 22, 2021, now Pat. No. 11,755,231, which is a continuation-in-part of application No. 16/273,583, filed on Feb. 12, 2019, now abandoned.

(60) Provisional application No. 62/803,342, filed on Feb. 8, 2019.

(51) Int. Cl.
    *G06F 3/06*    (2006.01)

(52) U.S. Cl.
    CPC ............ *G06F 3/065* (2013.01); *G06F 3/0619* (2013.01); *G06F 3/0683* (2013.01)

(58) Field of Classification Search
    CPC ....... G06F 3/065; G06F 3/0619; G06F 3/0683
    USPC .................................................. 711/162
    See application file for complete search history.

*Primary Examiner* — Gautam Sain
(74) *Attorney, Agent, or Firm* — MEITAR PATENTS LTD.

(57) ABSTRACT

An information management system creates a modified representation of backup files in a backup copy on restore to overcome the difficulties and challenges imposed by the legal and administrative requirements on the handling of personally information without making changes to the backup copy. In an example, a restore modification component searches backup data files as they are restored from a backup copy but before the restored data files are written into the primary storage system. When the restore modification component identifies a backup data file with a record that matches search criteria defined in the modification repository, the restore modification component replaces one or more of the restored data field values in the record with replacement data values obtained from the modification repository according to respective replacement rules. In this way, the information management system can create a modified representation of the backup copy data without modifying the backup copy.

12 Claims, 4 Drawing Sheets

MODIFICATION REPOSITORY FILE

| Record ID | Table | Action Type | Action |
|---|---|---|---|
| 123456 | Marketing Leads | Forget | Replace Values |
| 111111 | Marketing Leads | Rectify | 1st Name: Max->Tom |
| 222222 | Mailing List | Forget | Replace Values |

FIG. 5

MARKETING LEADS (RESTORED FILE)

| Record ID | Name | Address | Social Security # | Citizenship |
|---|---|---|---|---|
| 123456 | John | 123 Axel Rd | 123-45-6789 | US |
| 111111 | Max | 453 Main St | 234-56-7890 | CA |
| 654321 | Roy | 12 Prairie Ln | 345-67-8901 | UK |

FIG. 6

MARKETING LEADS (REPLACEMENT FILE)

| Record ID | Name | Address | Social Security # | Citizenship |
|---|---|---|---|---|
| 123456 | Forgotten | XXXXXXXX | 999-99-9999 | ZW |
| 111111 | Tom | 453 Main St | 234-56-7890 | CA |
| 654321 | Roy | 12 Prairie Ln | 345-67-8901 | UK |

MODIFIED REPRESENTATION OF BACKUP COPY ON RESTORE

CROSS-REFERENCE TO RELATED APPLICATION

This application is a continuation of U.S. patent application Ser. No. 17/353,849, filed Jun. 22, 2021, which is a continuation in part of U.S. patent application Ser. No. 16/273,583, filed Feb. 12, 2019, which claims the benefit of U.S. Provisional Patent Application 62/803,342, filed Feb. 8, 2019. The disclosures of these related applications are incorporated herein by reference.

BACKGROUND

The rapid growth in global online computing and communications over the past few decades has significantly increased the number and types of interactions between people and computer systems. As people become accustomed to working, communicating, and socializing with one another over computer networks, so too do they become more comfortable transmitting and sharing their Personally Identifiable Information (PII) and other sensitive data with others online and storing their personally identifiable information in remote cloud-based applications (often called software as a service—SaaS) and other remote storage systems. Personally identifiable information is information that directly or indirectly identifies a person, including, for example, a person's name, address, birth date, social security number, and physical attributes such as fingerprints and images. The high levels of comfort many people have using their personally identifiable information and other sensitive data with online systems may not be justified, making privacy and security safeguards all the more important.

The recent increase in legal and administrative requirements imposed on the handling of personally identifiable information and other sensitive data has encouraged business entities that receive, use, and transmit personally identifiable information to install policies and take other measures to comply with privacy and security laws and guidelines. Examples of the legal requirements that have been enacted over the past few years include the United States' Heath Insurance Portability and Accountability Act (HIPPA), which protects a patient's medical information, and the European Union's General Data Protection Regulation (GDPR), which increases the level of control people in the European Union have over their personal data. For example, the GDPR requires companies to provide greater transparency regarding their use of an individual's data, and requires security measures and controls to be put in place to protect his or her data. In addition, the GDPR affords EU residents the "right to be forgotten" by having their data removed from companies' records, and the right of an individual to have inaccurate personal data "rectified," or completed if it is incomplete.

The increased level of control individuals have over their personally identifiable information and other sensitive data directly impacts almost every company, software company, and specifically companies whose businesses involves backup, archiving, and disaster recovery.

SUMMARY

Example embodiments described herein provide information management systems and methods for creating a modified representation of one or more backup files in a backup copy on restore (or other processes in which backups are read), and overcoming the challenges imposed by the legal and administrative requirements on the handling of personally identifiable information and other sensitive data without making changes to the backup copy.

In one aspect, the invention features a method of creating a modified representation of backup copy data on restore/read. In accordance with this method, data comprising files stored in one or more primary storage devices in a primary storage system are copied to one or more backup storage devices in a backup storage system to create a backup copy comprising backup files. With a modification component executing on computer hardware, a modification repository is accessed. The modification repository comprises search criteria for identifying one or more of the backup files associated with an entity and one or more rules for modifying restored/read copies of the one or more identified backup files. One or more backup files are restored from the backup copy stored in the one or more backup storage devices in the backup storage system to the one or more primary storage devices in the primary storage system. The read operation comprises, with the modification component, identifying one or more of the backup files in the backup copy that meet the search criteria, modifying one or more restored copies of the one or more identified backup files according to the one or more rules to create one or more respective replacement files, and transmitting the one or more replacement files to the one or more primary storage devices in the primary storage system in place of the one or more identified restored backup files.

In another aspect, the invention features a system for creating a modified representation of backup copy data on restore. The system includes a primary storage system, a backup storage system, and a modification component. The primary storage system includes one or more primary storage devices that store primary files. The backup storage system includes one or more backup storage devices that store a backup copy in a backup format, wherein the one or more primary storage devices copy one or more of the primary files to one or more of the backup storage devices to create and store a backup copy comprising backup files in a backup format. The modification component executes programmatic rules on computer hardware to access a modification repository comprising search criteria to identify one or more of the backup files associated with an entity and one or more rules for modifying restored copies of the one or more identified backup files. The modification component identifies one or more of the backup files in the backup copy that meet the search criteria, modifies restored copies of the one or more identified backup files according to the one or more rules to create one or more replacement files, and transmits the one or more replacement files to the one or more primary storage devices in the primary storage system in place of the one or more identified backup files.

In another aspect, the invention features a computer program product for execution by a computer system and comprising at least one non-transitory computer-readable medium having computer-readable program code portions embodied therein. The computer-readable program code portions comprise an executable code portion configured to copy data comprising files stored in one or more primary storage devices in a primary storage system to one or more backup storage devices in a backup storage system to create a backup copy comprising backup files. The computer-readable program code portions comprise an executable code portion configured to access, with a modification component, a modification repository comprising search criteria for identifying one or more of the backup files associated with an entity and one or more rules for modifying restored copies of the one or more identified backup files. The computer-readable program code portions further comprise an executable code portion configured to restore one or more backup files from the backup copy stored in the one or more backup storage devices in the backup storage system to the one or more primary storage devices in the primary storage system, wherein restoring of the one or more backup files comprises, with the modification component, identifying one or more of the backup files in the backup copy that meet the search criteria, modifying one or more restored copies of the one or more identified backup files according to the one or more rules to create one or more respective replacement files, and transmitting the one or more replacement files to the one or more primary storage devices in the primary storage system in place of the one or more identified restored backup files.

The invention also features apparatus operable to implement the method described above and computer-readable media storing computer-readable instructions causing a computer to implement the method described above.

DETAILED DESCRIPTION

Introduction

Example embodiments described herein provide information management systems and methods for creating a modified representation of one or more backup files in a backup copy on restore, and overcoming the challenges imposed by the legal and administrative requirements on the handling of personally identifiable information and other sensitive data without making changes to the backup copy.

In the following description, like reference numbers are used to identify like elements. Furthermore, the drawings are intended to illustrate major features of exemplary embodiments in a diagrammatic manner. The drawings are not intended to limit the disclosed aspects nor depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "module" may be hardware, software, or firmware, or may be a combination or components thereof.

A "replacement file" is a file that replaces another file. A replacement file can be an original file or a modified file.

Exemplary Embodiments

Figure 1:
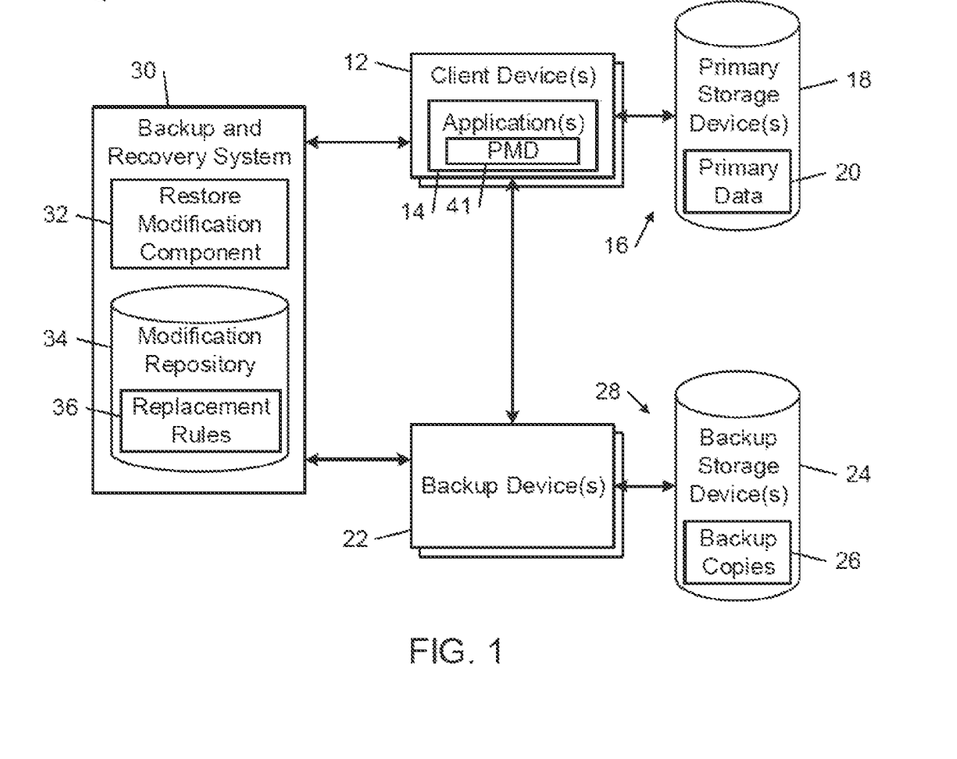
FIG. 1 is a block diagram of an embodiment of an information management system.

FIG. 1 is a block diagram of an embodiment of an information management system 10 that includes various components that individually or collectively, in whole or in part manage, transfer, store, and process data and metadata that is generated by one or more client devices 12 and their respective applications 14. Metadata includes information about data objects or other information characterizing data objects.

Examples of the types of client devices 12 that can produce valuable data that may benefit from being protected in a backup storage system include workstations, servers, laptops, mobile phones, as well as internet-of-things devices, such as autonomous computing and communicating agents and smart sensors. The client devices 12 and other components in the information management system 10 typically are interconnected by a variety of different types of network technologies, including a wide area network, a local area network, a virtual private network, and the internet, to name a few.

The one or more computer-implemented client devices 12 and other components in the information management system 10 generate valuable data and metadata as they execute one or more respective applications 14. Example applications 14 include client device and server applications and operating systems, mail applications, file applications, database applications, as well as word processing applications, spreadsheet applications, presentation applications, financial applications, and other desktop publishing and productivity applications.

The data and metadata generated by the client devices 12 and other components in the information management system 10 are stored in a primary storage system 16 that includes one or more primary storage devices 18. The data and metadata that is produced by the applications 14 (including client and server operating systems) executing on client devices 12 and stored on the primary storage devices 18 is referred to herein as "primary data." Primary data 20 typically is in the native format of the application or applications that generated the primary data 20. Primary data 20 can include databases, files, directories, file system volumes, data blocks, and other groupings or subsets of data objects. In some embodiments, primary data is formatted according to, for example, a flat file system in which directory entries for all files are stored in a single directory.

The client devices 12 are connected with one or more of the primary storage devices 18. The primary storage devices may be implemented by any of a wide variety of different types of storage devices, including disk drives, hard-disk arrays, solid-state drives, and network attached storage.

For a variety of reasons, the primary data 20 stored on one or more of the primary storage devices 18 may become unavailable. For example, some of all of the primary data 20 may be deleted, overwritten, damaged, or otherwise corrupted. For these reasons, the information management system 10 includes a backup storage system 28 that has a one or more backup devices 22 and one or more backup storage devices 24 that create and store one or several backup copies 26 of the primary data 20. In some examples of this process, the one or more client devices 12 retrieve primary data 20 and transmit the retrieved primary data 20 to the backup storage devices 24 for storage as a backup copy 26 in the backup storage system 28.

The backup copies 26 can be used to restore primary data 20 (e.g., data and metadata) that has been compromised (e.g., lost or corrupted), thereby enabling some or all of the compromised data to be recovered up to a certain time in the past corresponding to the time the last backup copy was made. In this way, the backup copies can assist with regulatory data retention and electronic discovery requirements. The backup copies may be created in different ways to produce different types of backups, including backup operations, archive operations, snapshot operations, and replication operations. Backup copies typically are stored in a backup format, which may be different from the native application format of the files in the primary storage system. A restore operation performed on a backup copy produces data and metadata that is formatted in the native application format of the application or applications that produced the primary data, or transmitted to the application in another format which is supported (e.g. via an Application Programmer Interface—API).

Referring to FIG. 1, the information management system 10 also includes a backup and recovery system 30 that is configured to initiate, coordinate, and control operations performed by the information management system 10. The backup and recovery system can communicate with and control some or all aspects of the information management system 10, including operations and processes for generating and storing the primary data 20 and the backup copies 26, and managing and protecting the primary data 20 and the backup copies 26. In embodiments, the backup and recovery system 30 may be a software module or other application. In certain embodiments, the backup and recovery system 30 performs operations including starting backup copy processes, allocating backup storage devices, deleting expired backup copies, and restoring backup copies into the primary storage system 16.

In some embodiments, the backup and recovery system 30 includes a restore modification component 32, and a modification repository 34 that includes replacement data and replacement rules 36 that specify the criteria for replacing restored backup copy data with replacement data or values. As explained in detail below, the restore modification component 32 searches backup data files as they are restored or read from a backup copy 26 but before the restored data files are written into the primary storage system 16. When the restore modification component 32 identifies a backup data file with a record that matches search criteria defined in the modification repository 34, the restore modification component 32 replaces one or more of the restored data field values in the record with replacement data values obtained from the modification repository 34 according to the respective replacement rules 36. In this way, the information management system 10 can create a modified representation of the backup copy data without modifying the backup copy 26. As a result, users of the information management system 10 are presented with only the modified representation of the backup copy data 26; the original backup file data is not exposed to the client devices 12 nor to the primary storages system 16.

Figure 2:
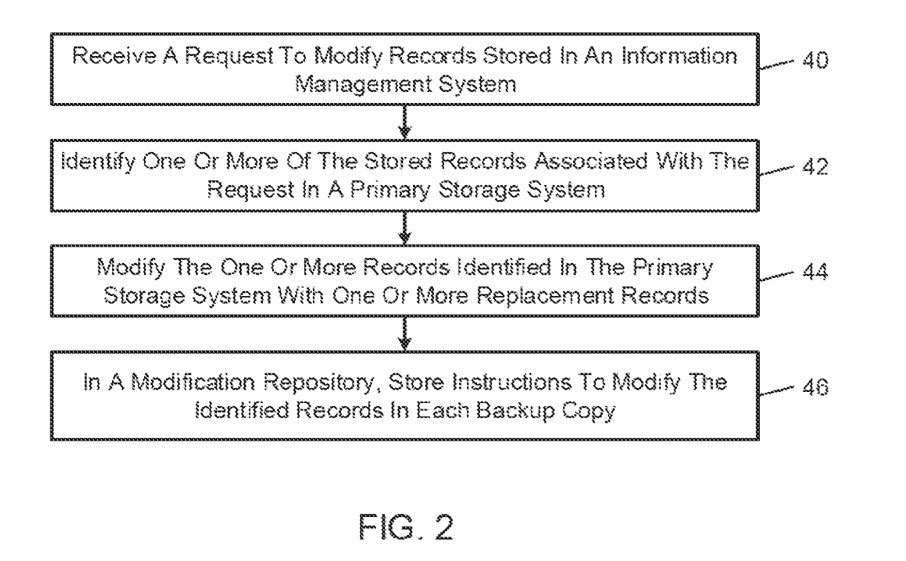
FIG. 2 shows a flow diagram of an embodiment of a process for modifying one or more restored backup file records in an information management system.

FIG. 2 shows a flow diagram of an embodiment of a process for modifying one or more file records in an information management system 10 of an organization (e.g., a business entity, such as a company, corporation, or non-profit organization).

In accordance with this embodiment, the information management system 10, receives a request from an individual to modify records stored in the information management system 10 (FIG. 2, block 40). In some examples, the request includes a request to remove from the information management system 10 personally identifying information or other sensitive data that is associated with the individual, such as the individual's name, email address, home address, employee identification number, social security number, driver's license number, passport information, and date of birth.

In response to the request, a primary modification component (PMD) 41 in one or more of the primary applications identifies one or more of the stored file records in the primary storage system 16 that are associated with the request (FIG. 2, block 42). In some examples, the PMD 41 uses the information included with the request (e.g., personally identifying information or other sensitive information) to generate a search query for locating records in the files stored in the primary storage system 16 that match the search query criteria. In some examples, if there are one or more matching records identified in the primary storage system 16, the PMD 41 may utilize data contained in the identified records to expand the search for matching records. For example, the PMD 41 may extract additional search criteria data from one or more records identified in the initial search to create an updated search query and perform the updated search for other records that match the additional search criteria.

After one or more matching file records have been identified in the primary storage system 16, the PMD 41 modifies the one or more matching records in the files stored in the primary storage system 16 with one or more replacement record values in accordance with the replacement rules 36 in the modification repository 34 that is managed by the PMD 41 (FIG. 2, block 44). In some examples, the PMD 41 modifies the entries in identified ones of data fields in a file (e.g., table) with at least one record that matches the search criteria. In this process, the storage manager 30 may modify the entries in the identified data fields of the file record that matches the search criteria in a variety of different ways depending on the application, including deleting the existing data field values or replacing the existing data field values with, for example, new data values, such as randomly generated or otherwise obfuscating data values. In other examples, instead of replacing individual data record values in a file, the PMD 41 replaces the file with a replacement file that contains the replacement record data field values.

After the identified matching records in the files stored in the primary storage system 16 have been modified, the backup and recovery system 30 stores instructions in the modification repository 34 for modifying the identified file records in each backup copy 26 (FIG. 2, block 46). In some examples, the instructions include a specification of the identifiers of the identified data files and the associated records to be modified, the modification method to apply to the matching records in the data files (e.g., delete, obfuscate, forget, or rectify), and replacement values for respective ones of the data fields in the records of the identified data files.

In some embodiments, the instructions and rules for modifying content may be time-sensitive. Specifically, a rule that is configured in the modification repository 34 may have retrospective effect, being applicable to data stored in the primary storage system 16 prior to the request date, but may be inapplicable to data stored after the request date. Thus, when a request is received to modify content of a specified type with respect to a given entity, the changes to the files in the primary storage system and the corresponding rule for modifying the content in restored copies of in the backup files may apply only to backup files that were created prior to the request date. Subsequently, in creating a restored copy of data files with respect to the given entity, the backup and recovery system 30 will modify the content of the specified type that was stored in the primary storage system prior to the request date in accordance with the applicable rule, while the content of the specified type that was stored in the primary storage system after the request date is not modified in the restored copy.

Figure 3:
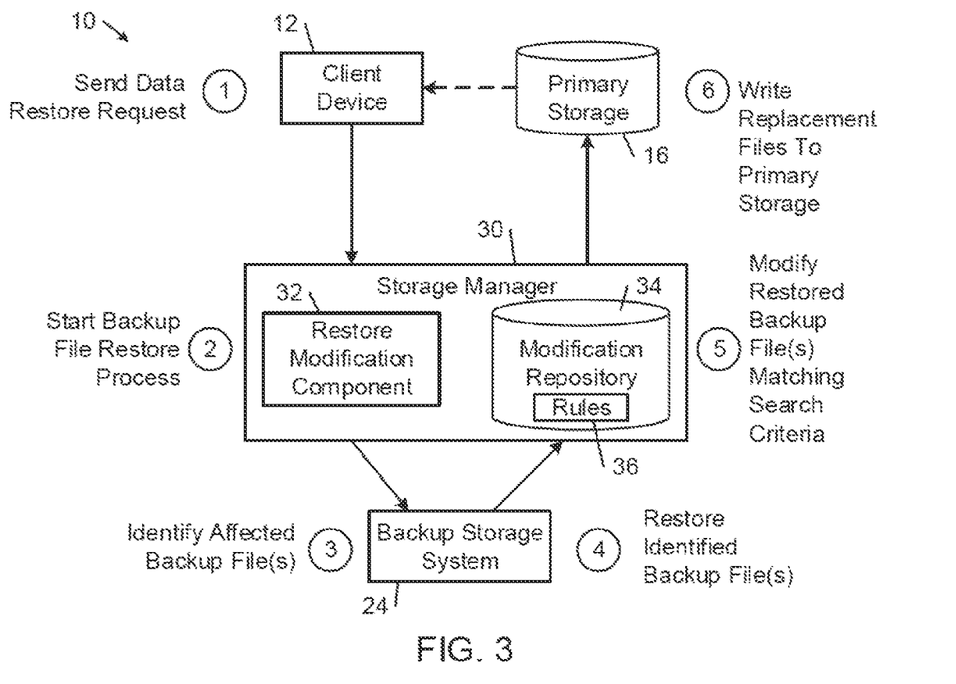
FIG. 3 is a data flow diagram of an embodiment of a data restore process.

FIG. 3 shows a data flow diagram of an embodiment of a data restore process that is implemented by components of the information management system 10 to create a modified representation of restored backup files.

In this embodiment, a client device 12 initially sends to the backup and recovery system 30 a request to restore data from a backup copy 26 (FIG. 3, step 1). In some examples, the client device 12 sends the restore request in response to a data loss event in the primary storage system 16. In general, the data restore process may be partial restore of only the affected data files and applications; alternatively, the restore process may involve a complete restore of the primary storage system 16. Alternatively, records from the backup copies 26 could be read or inspected without eventually restoring them into the primary storage.

In response to the request from the client device 12 to restore data from a backup copy 26, the backup and recovery system 30 initiates the restore process by instructing one or more of the backup devices 22 (FIG. 1) to restore one or more of the files in a backup copy (e.g., the most recent backup copy) that were affected by the data loss event (FIG. 3, step 2). Alternatively, the backup and recovery system 30 may initiate a complete restore of the primary storage system.

The backup storage devices 22 (FIG. 1) identify and retrieve the affected backup files (FIG. 3, step 3). Next, the backup storage devices 22 (FIG. 1) restore the identified backup files and transmit the restored backup files to the backup and recovery system (FIG. 4, step 4).

Figure 4:
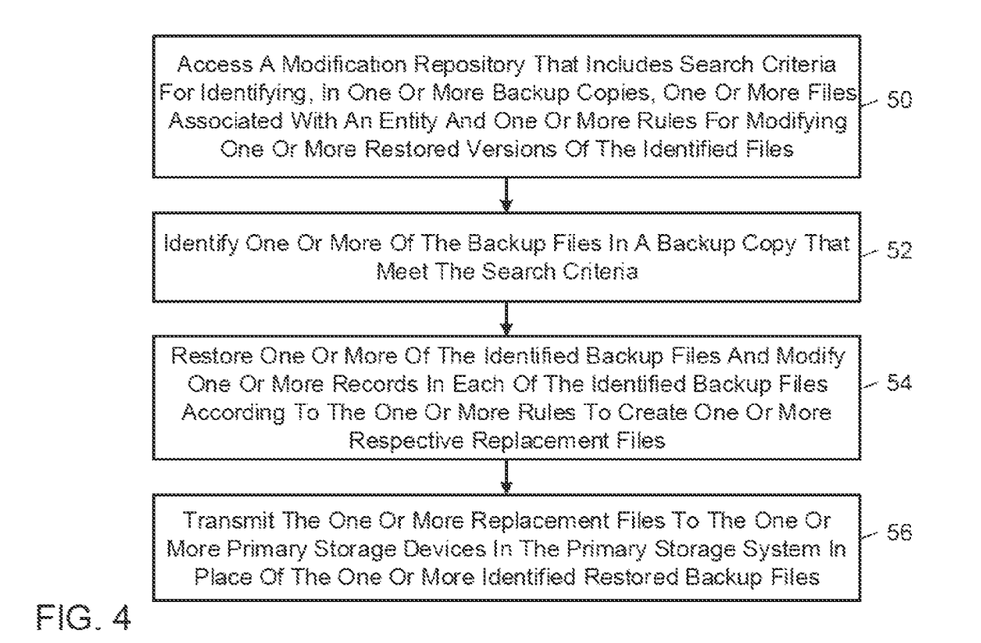
FIG. 4 is a flow diagram of an embodiment of a process of restoring the primary storage system with data including one or more replacement files.

The restore modification component 32 searches the data files as they are being read from a backup copy 26 but before the restored data files are written into the primary storage system 16 (FIG. 4, step 5). When the restore modification component 32 identifies a data file with a record that matches search criteria defined in the modification repository 34, the restore modification component 32 replaces the restored data field values with replacement values obtained from the modification repository 34 according to the corresponding replacement rules 36. In this way, the information management system 10 can create a modified representation of the backup copy data without modifying the backup copy 26. As a result, users of the information management system 10 are presented with only the modified representation of the of the backup copy data 26 that is stored in the primary storage system 16.

After the restored backup files with records that match the search criteria have been identified and modified with replacement values stored in the modification repository 34 in accordance with the replacement rules 36, the backup and recovery system 30 requests the primary storage devices 12 in the primary storage system 16 to write the restored and modified backup files into the primary data 20 (FIG. 4, step 6).

FIG. 4 shows a flow diagram of a process performed by an embodiment of the backup and recovery system 30 for restoring the primary storage system with data including one or more files that include replacement data.

In accordance with this process, the backup and recovery system 30 accesses a modification repository 34 (FIG. 3) that includes search criteria for identifying, in one or more backup copies, one or more files associated with an entity and one or more rules 36 for modifying one or more restored versions of the identified files (FIG. 4, block 50). In some embodiments, the search criteria include, for example, record identifiers, file identifiers, and personally identifying information or other sensitive data that is associated with the individual, such as the individual's name, email address, home address, employee identification number, social security number, driver's license number, passport information, and date of birth.

Figure 5:
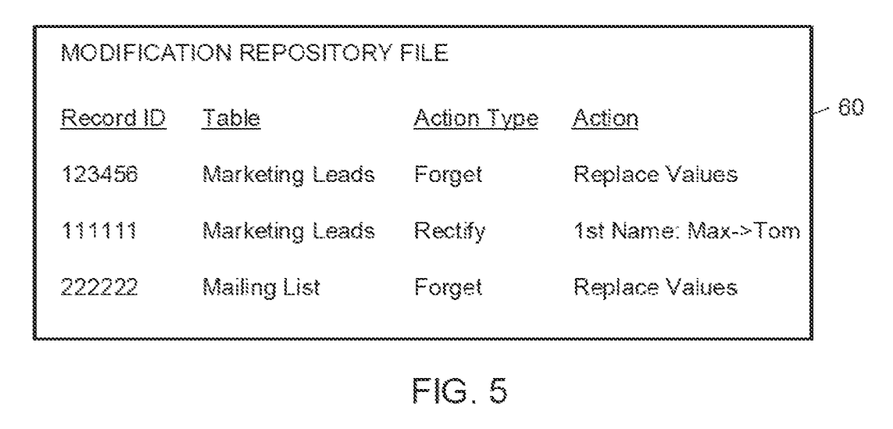
FIG. 5 is an example of a file in a modification repository that includes a list of record identifiers each associated with respective set of attribute values and instructions for modifying restored backup data with replacement values before writing the modified restored backup data to a primary storage system.

FIG. 5 shows an exemplary embodiment of a modification repository file 60 that may be stored in the modification repository 34 (see FIGS. 1 and 3). In this example, the modification repository file 60 includes a set of four data types: Record ID; Table; Action Type; and Action. In this exemplary embodiment, a Record ID is a unique identifier that is assigned to an entity (e.g., a person or organization); a Table is a unique identifier that is assigned to a table file (e.g., Marketing Leads table and Mailing List table); an Action Type identifies a type of process that is performed when activated (e.g., Forget or Rectify in the context of the EU's GDPR rules); and an Action specifies the operations that will be performed when the Action is activated (e.g., replace data field values with replacement values in a file record, or replace an entity's first name with another name in a file record).

Referring back to FIG. 4, the backup and recovery system 30 identifies one or more of the backup files that meet the search criteria (FIG. 4, block 52). In this process, the backup and recovery system 30 searches the one or more backup files in a backup copy 26 for records that include data field values that match data field values in the modification repository file 60. For example, the first row of the Modification Repository file includes a Record ID (i.e., 123456) that matches the Record ID in the first row of the Marketing Leads file 62 in the backup copy 26.

The backup and recovery system 30 restores one or more of the identified backup files and modifies one or more records in each of the identified backup files according to the one or more rules to create one or more respective replacement files (FIG. 4, block 54). In some examples, the types of replacement values that can be entered into the data fields of a restored version of a file is constrained for data integrity and consistency purposes. For example, in the illustrated example of the replacement Marketing Leads file 64 in FIG. 7, the Social Security data field must contain nine numbers, and the Citizenship data field must contain a valid country code. In some embodiments, in order to avoid inconsistencies and maintain valid references between files, a data record cannot be deleted; instead, the record must include at least a valid Record ID.

Figure 6:
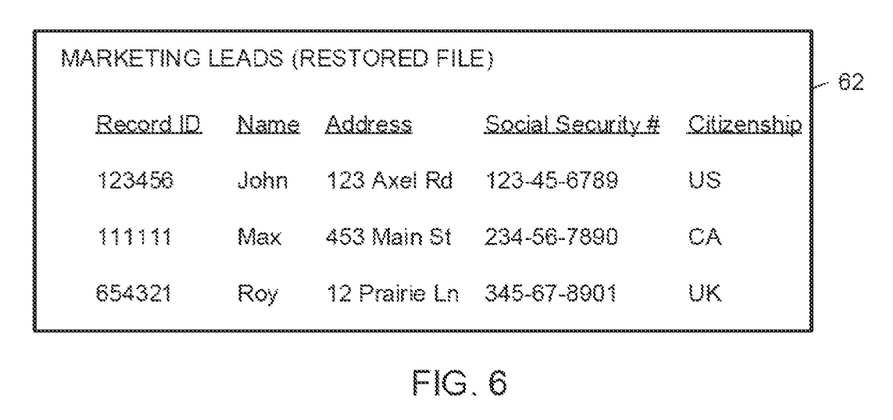
FIG. 6 is an example of a marketing leads file that was restored from a backup.

In the illustrated example, the Record IDs in the first rows of the Modification Repository file 60 and the Marketing Leads file 62 match (i.e., are the same). Accordingly, based on the rules specified in the first row of the Modification Repository File 60, the backup and recovery system 30 performs a "Forget" operation on the first row of the Marketing Leads file 62 (i.e., Record ID 123456). In some embodiments, the restore modification component logic may take the schema of the restore data into account. For example, when files are stored in the primary storage system 16 in accordance with a given schema, and a request is received to modify content of a specified type with respect to a given entity, the backup and recovery system 30 may use the schema in identifying data fields of the specified type in creating restored copies of the files. In accordance with exemplary rules associated with the "Forget" operation, the backup and recovery system 30 replaces the Name attribute value in the Marketing Leads file with the data field value "Forgotten," replaces the Address attribute value in the Marketing Leads file with the data field value "XXXXXXXXXX," replaces a none digit Social Security number attribute value with the data field value "999-99-9999", and replaces the US Citizenship attribute value with the data field value "ZW" (i.e., the country code for Zimbabwe). In some examples, phone numbers, which may consist of 10 or 11 digits, would be similarly replaced by 999-999-9999 or 9-999-999-9999, fields of type string may be replaced with "GDPR_forgotten", and fields of numeric type may be replaced with −1. When the schema is taken into account, the backup and recovery system 30 can identify the fields to be modified automatically, rather than requiring the requester to specify explicitly all the fields that are to be modified.

Figure 7:
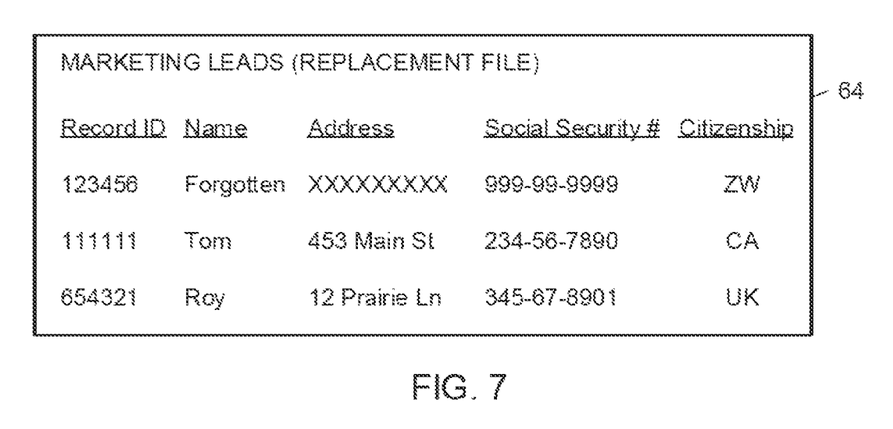
FIG. 7 is an example of a modified version of the marketing leads file of FIG. 6 in which the first and second rows of data have been modified to include attribute values that have been modified respectively in accordance with the "Forget" request and the "Rectify" request in the modification repository shown in FIG. 5.

In addition, the second rows of the Modification Repository file 60 and the Marketing Leads file 62 match (i.e., are the same). Accordingly, based on the rules specified in the second row of the Modification Repository File, the backup and recovery system 30 performs a "Rectify" operation on the second row of the Marketing Leads file 62. In accordance with the rules of the "Rectify" operation, the backup and recovery system 30 replaces the Name data field value (i.e., Max) in the Marketing Leads file 64 with "Tom" in accordance with the "Action" specified in the second row of the Modification Repository file 60.

After the "Forget" and "Rectify" operations are completed, the backup and recovery system 30 transmits the one or more replacement files to the one or more primary storage devices 18 in the primary storage system 16 in place of the one or more corresponding identified restored backup files (FIG. 4, block 56).

The above-described approach for creating a modified representation of a backup copy 26 may be used in a variety of different use cases.

For example, another embodiment of the information management system 10 performs a method that includes a primary storage system 16, a secondary storage system 28, an output interface, and a personal data modification component on a data path between the secondary storage system and the output interface. A person's personally identifiable information or other sensitive data is stored as primary data 20 on one or more primary storage devices and a copy of the person's personally identifiable information is stored in a backup copy 26 on one or more backup storage devices. Responsive to a request to modify the person's stored personal data, the method includes (1) modifying the person's personal data stored on the primary storage system in accordance with the request (e.g., rectify or delete), and (2) configuring a restore modification component 32 to replace the person's personally identifiable information appearing in one or more files of a restored backup copy 26 with replacement values to create one or more replacement files and write the one or more replacement files without modifying the person's personally identifiable information in the backup copy 26.

In some embodiments, the information management system 10 is configured to comply with privacy requests under the European Union's General Data Protection Regulation (GDPR), including a request to "forget" a person and a request to "rectify" inaccurate or incomplete personal data stored in a company's stored records. In some examples, the information management system 10 modifies an individual's personal information in the primary storage system 16 in accordance with the privacy request and, during a restore operation, the information management system 10 modifies the pertinent parts of the individual's personal data record that is restored from an unmodified backup copy 26 and writing the modified data to the primary storage system 16. In particular, the backup and recovery system 30 component of the information management system 10 includes a restore modification component 32 and a modification repository 34 that includes a set of replacement rules 36. The restore modification component 32 transparently modifies the individuals' personal data after a backup copy 26 has been restored but before the restored data is written to the primary storage system 16 and presented to a user of the information management system 10. By only presenting the restored backup copy data after it has passed through the restore modification component 32, the example information management systems 10 described herein allow a person to exercise his or her GDPR rights to have his or her personally identifiable information and other sensitive data modified (e.g., deleted or rectified).

Exemplary Computer Apparatus

Figure 8:
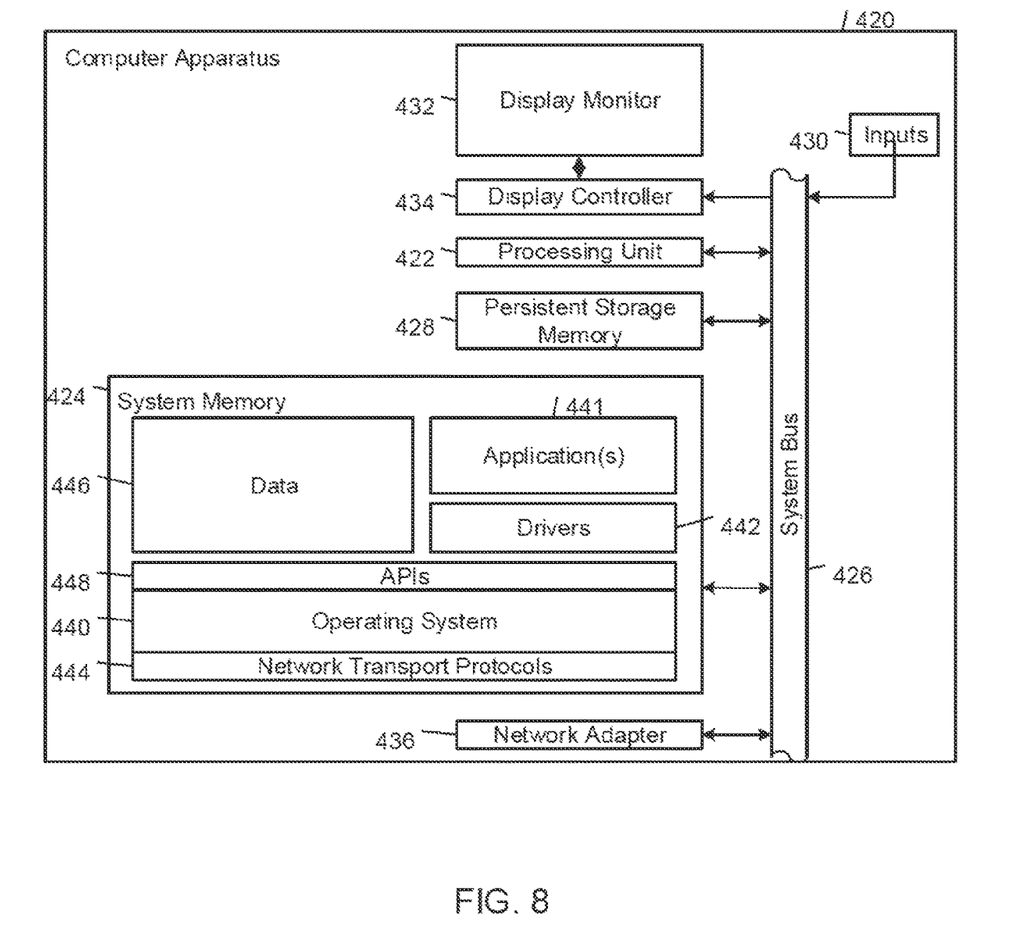
FIG. 8 is a block diagram of an example computer apparatus.

FIG. 8 shows an example embodiment of computer apparatus that is configured to implement one or more of the systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 420 also may include other input/output hardware (e.g., peripheral output devices, such as speakers and a printer). The computer apparatus 420 connects to other network nodes through a network adapter 436 (also referred to as a "network interface card" or NIC).

A number of program modules may be stored in the system memory 424, including application programming interfaces 448 (APIs), an operating system (OS) 440 (e.g., the Windows® operating system available from Microsoft Corporation of Redmond, Washington U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method of creating a modified representation of backup copy data on restore or read, comprising:
    copying data comprising files stored in one or more primary storage devices in a primary storage system in accordance with a given schema to one or more backup storage devices in a backup storage system to create a backup copy comprising backup files;
    in response to receipt of a request to modify content of a specified type with respect to a given entity, configuring a modification repository with a rule for modifying the content of the specified type;
    with a modification component executing on computer hardware subsequent to the request, accessing the modification repository to identify one or more of the backup files associated with the entity and one or more rules for modifying restored copies of the one or more identified backup files;
    automatically identifying, using the schema, one or more data fields of the specified type in the one or more identified backup files;
    creating a restored copy of one or more of the identified backup files from the backup copy stored in the one or more backup storage devices in the backup storage system while modifying the content in the identified data fields of the restored copy according to the rule for modifying the content without modifying the backup copy;
    transmitting the restored copy to the one or more primary storage devices; and
    storing the modified content of the restored copy in the primary storage system in place of the one or more of the identified backup files without making changes to the backup copy in the backup storage system.

2. The method of claim 1, wherein configuring the modification repository comprises, in response to receiving the request on a certain request date, configuring the rule to modify the content of the specified type in the backup files that were created prior to the request date, such that the content of the specified type that was stored in the primary storage system prior to the request date is modified in the restored copy in accordance with the rule, while the content of the specified type that was stored in the primary storage system after the request date is not modified in the restored copy.

3. The method of claim 1, and comprising, in response to the request, modifying the content of the specified type with respect to the given entity in the primary storage system without modifying the backup copy.

4. The method according to claim 1, wherein the content of the specified type comprises sensitive personal information with respect to the given entity.

5. The method of claim 1, wherein modifying the content comprises deleting the content from the identified data fields in the restored copy.

6. The method of claim 1, wherein modifying the content comprises rectifying the content in the identified data fields in the restored copy.

7. The method of claim 1, wherein the backup copy comprising the backup files is stored in the backup storage system in a backup format, different from a native application format of the files in the primary storage system, and creating the restored copy comprises restoring the identified backup files to the native application format.

8. A method of creating a modified representation of backup copy data on restore or read, comprising:
    copying data comprising files stored in one or more primary storage devices in a primary storage system to one or more backup storage devices in a backup storage system to create a backup copy comprising backup files;
    in response to receipt of a request by an entity, modifying content in the primary storage system and configuring a modification repository with a rule for modifying the content;
    with a modification component executing on computer hardware subsequent to the request, accessing the modification repository to identify one or more of the backup files associated with the entity and one or more rules for modifying restored copies of the one or more identified backup files;

creating a restored copy of one or more of the identified backup files from the backup copy stored in the one or more backup storage devices in the backup storage system while modifying the content in one or more data fields of the restored copy according to the rule for modifying the content without modifying the backup copy;

transmitting the restored copy to the one or more primary storage devices; and storing the modified content of the restored copy in the primary storage system in place of the one or more of the identified backup files without making changes to the backup copy in the backup storage system.

9. The method according to claim 8, wherein modifying the content comprises modifying sensitive personal information with respect to the entity.

10. The method of claim 8, wherein modifying the content comprises deleting the content from the one or more data fields in the restored copy.

11. The method of claim 8, wherein modifying the content comprises rectifying the content in the one or more data fields in the restored copy.

12. The method of claim 8, wherein the backup copy comprising the backup files is stored in the backup storage system in a backup format, different from a native application format of the files in the primary storage system, and creating the restored copy comprises restoring the identified backup files to the native application format.

* * * * *